(12) United States Patent
Weeks

(10) Patent No.: US 6,182,354 B1
(45) Date of Patent: Feb. 6, 2001

(54) BOILER TUBE SEGMENT AND BEND TOOL

(75) Inventor: Bruce V. Weeks, Pataskala, OH (US)

(73) Assignee: Advanced Cutting Technologies, Ltd., Westerville, OH (US)

( * ) Notice: Under 35 U.S.C. 154(b), the term of this patent shall be extended for 0 days.

(21) Appl. No.: 09/416,693

(22) Filed: Oct. 12, 1999

(51) Int. Cl.[7] ........................................ B23P 15/26
(52) U.S. Cl. ............... 29/727; 29/33 T; 29/726; 29/890.031
(58) Field of Search ............... 29/890.031, 726, 29/727, 33 R, 33 T, 723, 402.08

(56) References Cited

U.S. PATENT DOCUMENTS

| | | | |
|---|---|---|---|
| 3,835,520 | * 9/1974 | Sismore | 29/726 |
| 3,857,158 | * 12/1974 | Costello | 29/890.031 |
| 4,967,468 | * 11/1990 | Vossbrinck et al. | 29/726 |
| 5,205,038 | * 4/1993 | Archer et al. | 29/890.031 |
| 5,826,334 | * 10/1998 | Weeks et al. | 29/890.031 |
| 5,826,335 | * 10/1998 | Tegethoff et al. | 29/890.031 |
| 5,974,642 | * 11/1999 | Weeks et al. | 29/33 T |

* cited by examiner

Primary Examiner—I Cuda Rosenban
Assistant Examiner—Trinh Nguyen
(74) Attorney, Agent, or Firm—Thomas S. Baker, Jr.

(57) ABSTRACT

A power boiler tube removal tool assembly is provided with co-operating shear block cavity, shear blade, and anvil elements that function to shear and inwardly bend gap metal in a boiler tube flared-end segment to thereby facilitate subsequent boiler tube flared-end segment peeling, crushing, and withdrawal steps that complete tube end removal from retention within a boiler drum wall.

4 Claims, 4 Drawing Sheets

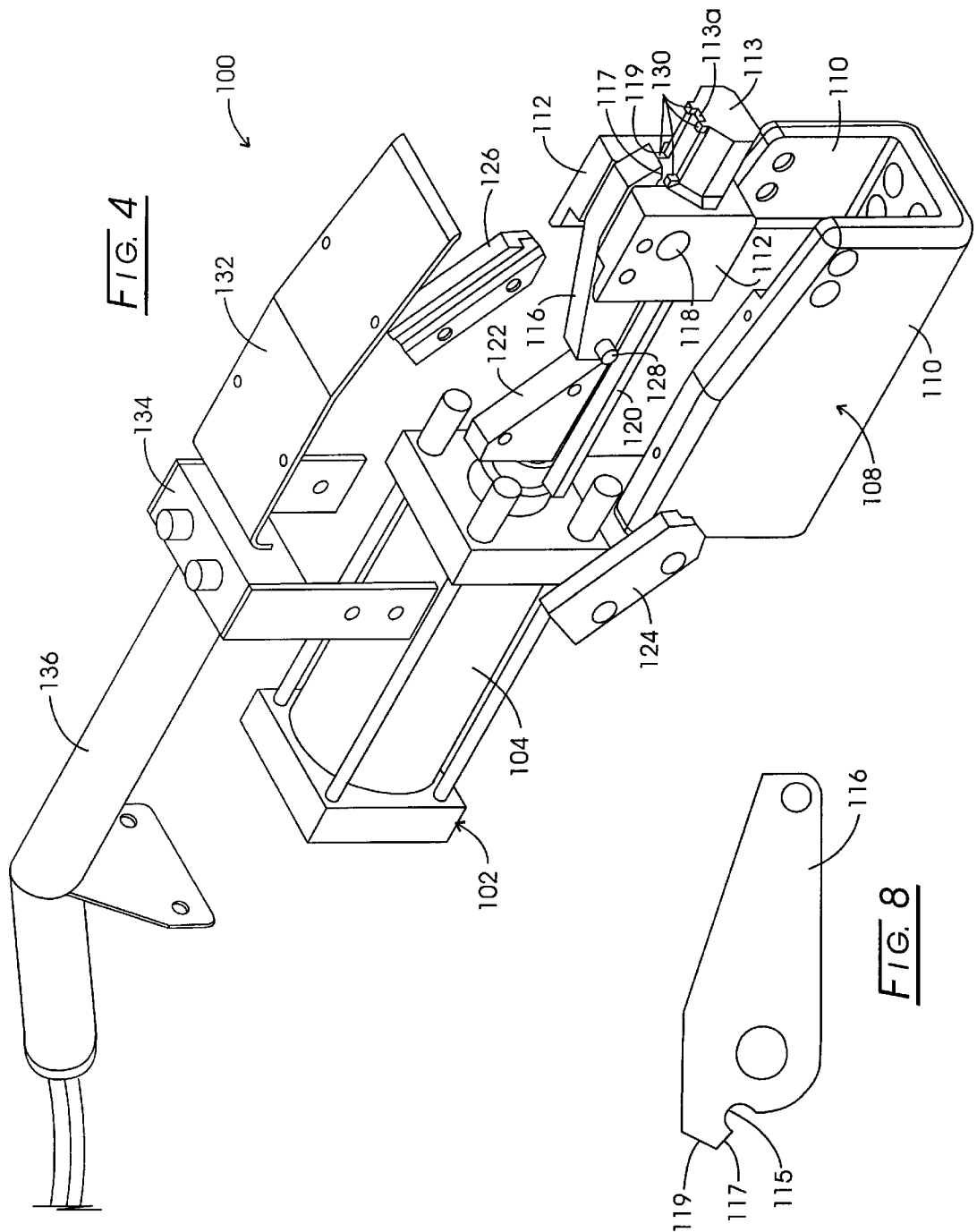

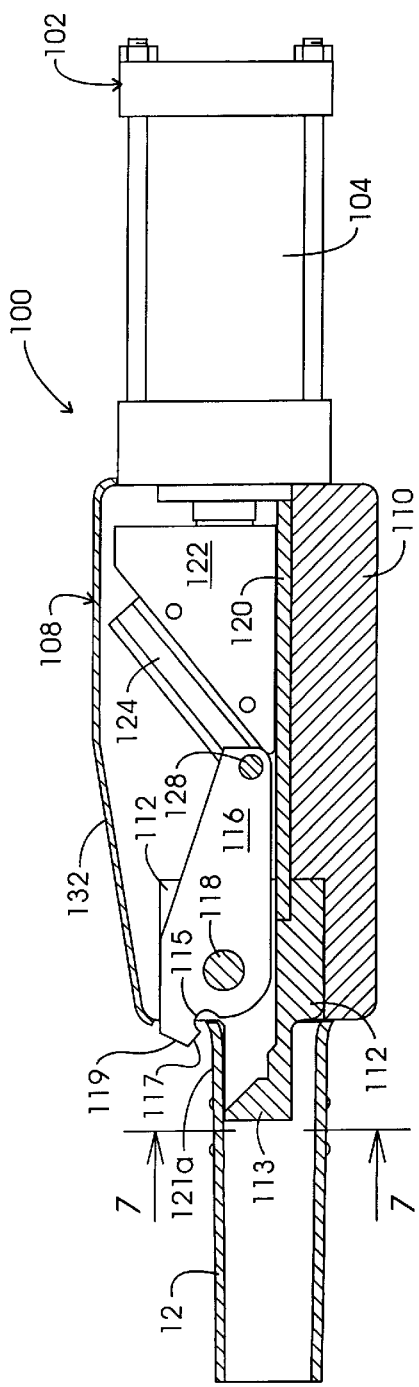
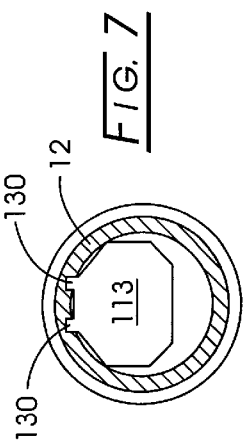
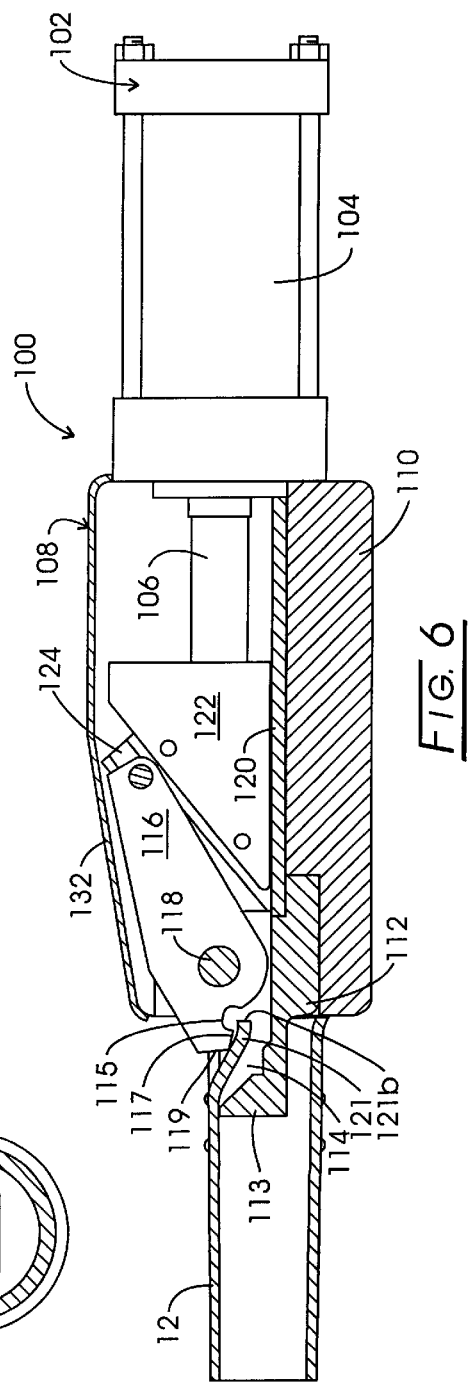

BOILER TUBE SEGMENT AND BEND TOOL

CROSS-REFERENCES

None.

FIELD OF THE INVENTION

This invention pertains generally to power boilers, and specifically concerns apparatus that is particularly useful in connection with the maintenance removal of selected installed boiler tubes for subsequent replacement

BACKGROUND OF THE INVENTION

Experience in connection with the removal of water-tubes and fire-tubes from within power boilers for replacement using a tube-end gap-cutting tool of the type disclosed and claimed in U.S. Pat. No. 5,893,209 granted to Weeks et al. has shown that because of depth-of-cut procedural limitations that may be in effect to avoid possible drum wall damage, or sometimes because of gap-cutting tool construction characteristics, sufficient gap metal in a remaining boiler tube end segment is not removed in the initial longitudinal gap cutting operation and particularly at the tube segment flared end. In some instances little or not flared-end metal at the gap location is initially removed using the known gap-cutting tool.

In order to properly accomplish preparation of a retained boiler tube flared-end segment for subsequent final gap metal removal steps of "peeling" and "crushing", I have devised a novel tool, sometimes called a "nipper" tool, that properly shears and bends to-be-removed gap metal in the boiler tube flared end to thereby complete the preliminary formation of the tube gap without damaging or removing metal from the co-operating boiler tube drum wall.

Other objects and advantages of the present invention will become apparent from a consideration of the descriptions, drawings, and claims which follow.

SUMMARY OF THE INVENTION

The present invention is basically comprised of a tool head subassembly provided with a rigid frame, an anvil and co-operating shear blade that is pivotally carried by the frame and engaged with a boiler tube flared end, a reciprocating cam that causes pivoting of the tool assembly shear blade element, and with a reversible, pressurized fluid actuator subassembly that is supported by the tool head frame and that causes reciprocating movement of the tool head cam element. Operation of the actuator subassembly in a positive direction, following insertion of the tool head anvil in a cut boiler tube flared-end and engagement of the tool shear blade with the boiler tube end segment flare, causes the shear blade to be rotated to double shear and downwardly bend a portion of the lip of the tube flare that ultimately comprises an extension of the desired tube end segment longitudinal gap. The tool may then be conveniently removed from engagement with the boiler tube end segment by simple longitudinal rotation, and the reciprocating cam retracted in preparation for next use of the tool.

BRIEF DESCRIPTION OF THE DRAWINGS

FIG. 4 is an exploded view of the boiler tube shear tool illustrated in FIG. 3;

FIG. 5 is an elevation section view of the FIG. 3 tool co-operating with a boiler tube flared end segment and in an initial operating condition;

FIG. 6 is a section view similar to FIG. 5 but illustrating the FIG. 3 tool after shearing and bending of tube flared end segment gap metal has been completed;

FIG. 7 is a section view taken at line 7—7 of FIG. 5; and

FIG. 8 is an enlarged view of a profile that is preferred for the invention shear blade element.

DETAILED DESCRIPTION

Figure 1:
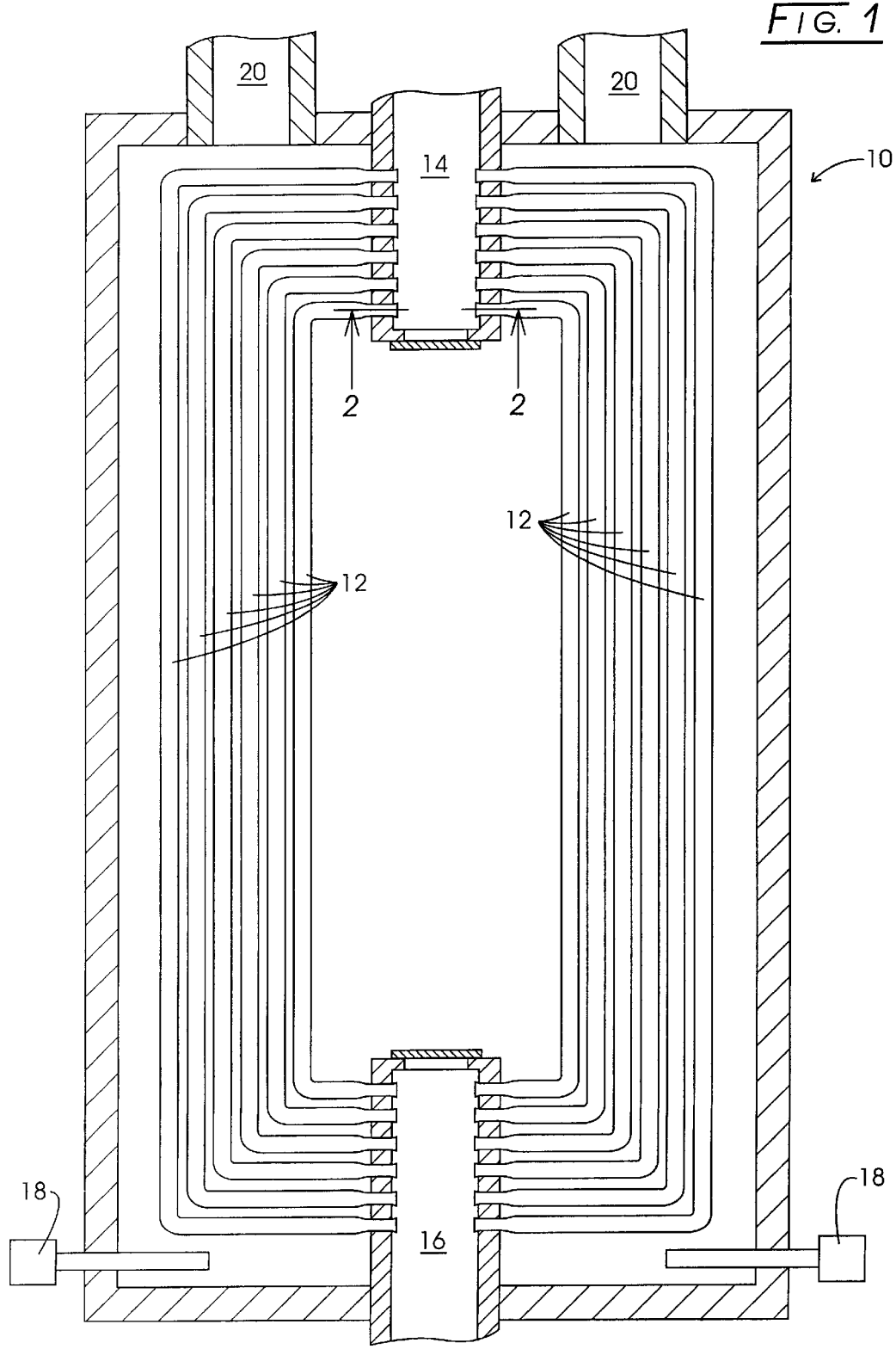
FIG. 1 is a schematic vertical section of a water-tube power boiler illustrating the environment in which the tool of the present invention is typically utilized.
Figure 2:
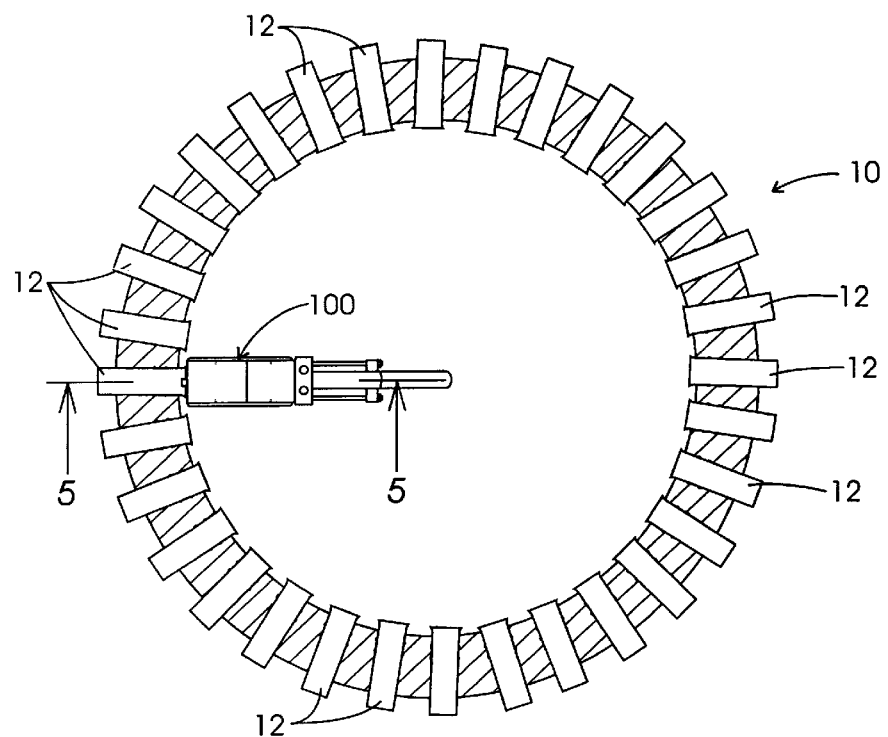
FIG. 2 is a section view taken at line 2—2 of FIG. 1.

FIG. 1 schematically illustrates a power boiler 10 having multiple conventional boiler water-tubes 12 installed with their upper and lower flared ends co-operating with boiler steam and mud drums 14 and 16, respectively. Burners 18 are typically fired by a carbonaceous fuel, and the resulting effluent gasses of combustion, following heat extraction for water and steam heating purposes, are exhausted from within power boiler 10 through chimney connections 20. As with all power boilers, it is necessary from time to time to remove and replace one or more of individual boiler tubes 12 from within power boiler 10, and such is basically accomplished by selected tubes first being cut at their ends adjacent the exterior wall metal of drums 14 and 16 for removal. The boiler tube flared-end shear tool 100 of the present invention pertains generally to the removal of the tube flared-end segments that are initially retained in the steam and mud drum peripheral walls and, as illustrated in FIG. 2, such tool is basically utilized from a position within the applicable boiler drum.

Figure 3:
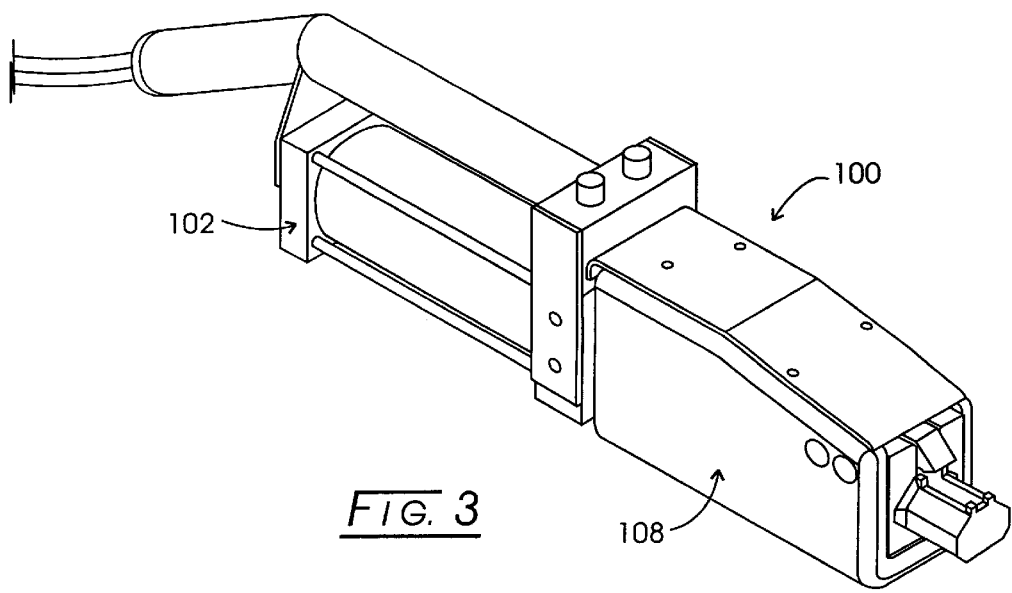
FIG. 3 is a perspective view of a preferred embodiment of the "nipper" boiler tube removal tool of the present invention.

FIGS. 3 and 4 best illustrate the basic construction details of tool assembly 100. (Not shown in the drawings, however, is the conventional system for supplying the flow of pressurized fluid, which may be either pressurized hydraulic fluid or compressed air, to the conventional bi-directional pressure actuator subassembly 102 included with tool 100). Tool assembly 100 includes, in addition to cylinder 104 and piston rod 106 of actuator subassembly 102, a tool head subassembly 108 that is basically comprised of rigid frame element 110, anvil block element 112 having shear cavity 114, rotatable shear blade element 116 carried in anvil block element 112 by pivot shaft 118, wear plate element 120 supported by frame 110 and extending from anvil block 112 to actuator subassembly 102, and cam body 122 supported by wear plate 120 and connected to the piston rod element 106 for reciprocation. Referring to FIG. 8, it should be noted that an undercut relief 115 is formed in shear blade element 116 just behind a shear edge 117 formed thereof. A bending edge 119 is located adjacent and in front of shear edge 117. Guide elements 124 and 126 are fixedly secured to opposite faces of cam body member 122. A lug pin 128, mounted in and projecting from opposite sides of the rear portion of shear blade element 116, co-operates with the ways provided in guide elements 124 and 126 and causes rotation of shear blade element 116 about pivot pin 118 as cam body 122 and its included guide member 124 and 126 are reciprocated by actuator subassembly 102.

Additionally, the upper surface 113a of the nose portion 113 of anvil block element 112 is advantageously provided with upwardly projecting locating lugs 130 (see FIGS. 4 and 7). Lugs 130 engage longitudinal gap edges previously cut in boiler tube segment 12 when nose 113 of shear block element 112 is properly inserted in that tube segment for the subsequent shearing and bending steps resulting from operation of actuator subassembly 102. It may be observed that upper surface 113a of nose portion 113 projects forward of the shear edge 117 formed on shear blade element 116. Thus, when actuator subassembly 102 advances cam body 122 to rotate shear blade element 116 about shaft 118, shear edge 117 engages gap metal 121 at 121a inwardly of gap metal edge 121b to cause such gap metal to be sheared and bent downwardly about anvil edge 113a. By causing shear blade element 116 to engage gap metal 121 inwardly of its outer edge 121b, blade element is drawn into tube segment 12 thereby preventing blade element 116 from moving away from or backing out of engagement with tub segment 12. This makes tool assembly 100 much easier to hold in position during the shearing and bending operation. Undercut relief 115 acts to receive the flared edge or end 121b of a tube segment 12 to prevent shear blade element 116 from engaging said flared edge prior to engagement with tube segment 12 at location 121a.

As illustrated in FIG. 4, tool assembly 100 also includes tool head cover 132, which is removably attached to frame member 110, housing 134 for the power system direction control valve, and tool handle 136. Components 134 and 136 are preferably removably attached to and carried by actuator subassembly 102. Subassembly 102 is removably mounted on tool frame 110 by the conventional threaded fasteners designated 103.

I claim:

1. A power boiler tube removal tool assembly for shearing and bending gap metal located in a boiler tube segment, and comprising:

a rigid tool frame;

a pressurized-fluid actuator carried by said tool frame;

a shear block element secured to and carried by said tool frame and having a shear cavity and an anvil partially defining said shear cavity;

a rotatable shear blade element pivotally carried by said shear block element and cooperating with said shear block element shear cavity; and a cam element slidably supported on said rigid tool frame, connected to said pressurized-fluid actuator for reciprocation, and co-operating with said rotatable shear blade element, said cam element causing rotation of said rotatable shear blade element within said shear block element shear cavity when said pressurized-fluid actuator is actuated sufficient to shear and inwardly bend gap metal from a co-operating boiler tube segment about said anvil.

2. The boiler tube removal tool inventions defined by claim 1, and wherein said shear block element is provided with a nose portion for insertion into a co-operating boiler tube segment, said nose portion having projecting location lugs that register and co-operate with a partially-completed longitudinal gap previously machined in the boiler tube segment.

3. The boiler tube removal tool invention of claim 1, and wherein said rotatable shear blade element has an undercut relief adapted to receive an end edge of the boiler tube segment when the boiler tube removal tool is co-operatively engaged with the boiler tube segment.

4. The boiler tube removal tool invention of claim 3, and wherein said rotatable shear blade element has a shear edge and a bending edge located adjacent and forward of said shear edge such that upon rotation of said rotatable shear blade element said shear edge first engages a gap metal outer surface of the boiler tube segment adjacent to and inwardly of a flared end to shear said gap metal and subsequently continued rotation of said rotatable shear blade element causes the boiler tube removal tool to be forcefully biased in a direction toward the boiler tube segment as said gap metal is bent downwardly.

* * * * *